(No Model.)
G. B. BOOMER.
STEAM RADIATOR.
No. 289,965. Patented Dec. 11, 1883.
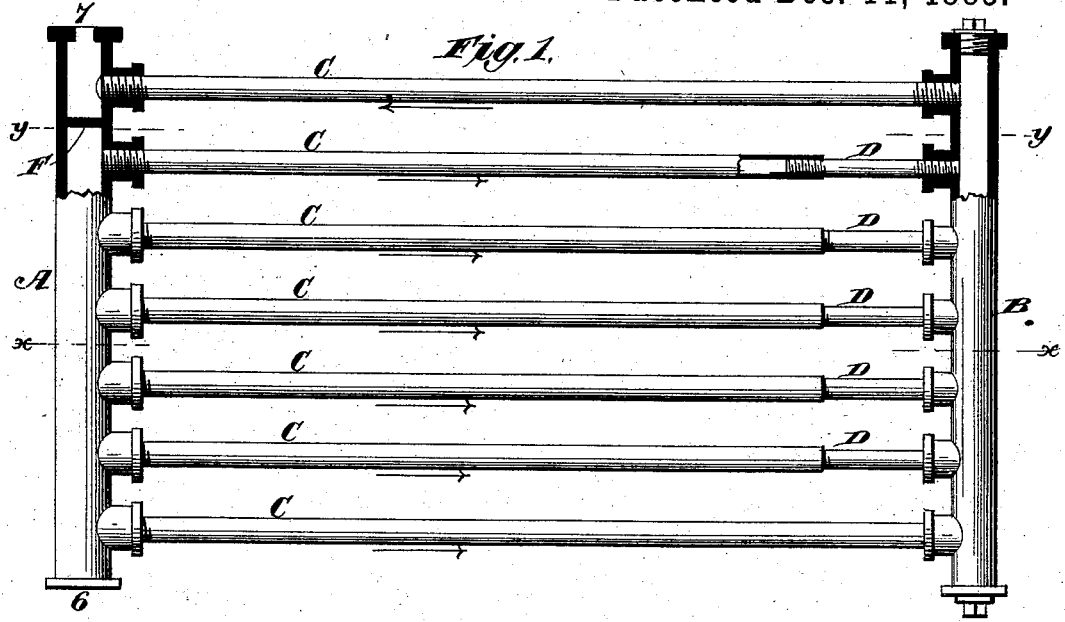
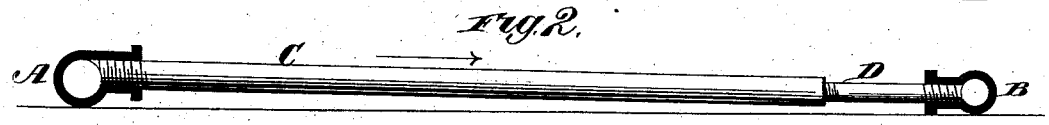
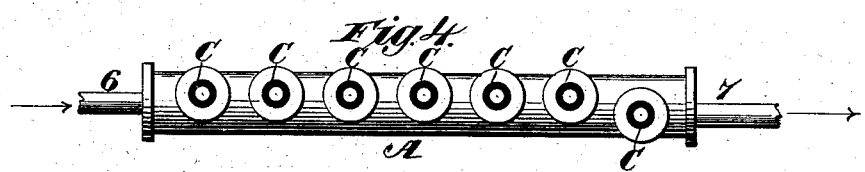
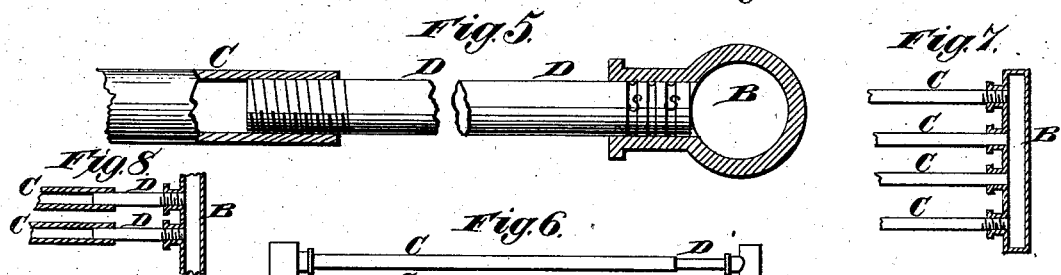
Witnesses.
Robert Everett
Jos. L. Coombs
Inventor.
George B. Boomer
By Van Santvoord & Hauff
Attys.

UNITED STATES PATENT OFFICE.

GEORGE B. BOOMER, OF TARRYTOWN, NEW YORK.

STEAM-RADIATOR.

SPECIFICATION forming part of Letters Patent No. 289,965, dated December 11, 1883.

Application filed August 8, 1883. (No model.)

*To all whom it may concern:*

Be it known that I, GEORGE B. BOOMER, a citizen of the United States, residing at Tarrytown, in the county of Westchester and State of New York, have invented new and useful Improvements in Steam-Radiators, of which the following is a specification.

This invention relates to the construction of steam heaters or radiators, and especially that class thereof in which a series of parallel pipes are connected together by means of hollow end heads or distributers, one of which receives the steam and discharges it, or the water of condensation, after its circulation through the pipes and the other head. Heretofore the pipes have been firmly united to both end heads; but this arrangement is objectionable, especially when, as for certain uses of the apparatus, the parts are made of brass, because the joints of the pipes and end heads are liable to be injuriously affected by the twisting of the heads due to an unequal expansion and contraction of the pipes.

To overcome this objection is one object of my invention, to which end it consists in connecting a portion of the pipes to one of the end heads by means of sliding expansion-joints, using fixed joints for connecting the remaining pipes to such head, as hereinafter more fully described.

It also consists in certain details of construction, hereinafter fully set forth, the whole being illustrated in the accompanying drawings, in which—

Figure 1 represents a plan view, partly in section. Fig. 2 is a longitudinal section approximately on the line $x$ $x$, Fig. 1. Fig. 3 is a like section approximately on the line $y$ $y$, Fig. 1. Fig. 4 is a cross-section. Fig. 5 shows one of the expansion-joints on a larger scale than in the previous figures. Figs. 6, 7, and 8 illustrate modifications.

Similar letters indicate corresponding parts.

The letters A B designate the end heads, and C the parallel pipes. These pipes C are severally united to the head A by fixed joints, and the outer pipes of the series are united to the head B also by fixed joints, while the intermediate pipes are united to the last-named head by expansion-joints. These expansion-joints are formed by short supplemental pipes or tubes D, which are screwed or otherwise attached to the proper pipes at one end, but are left detached at the other end, where they enter the head B, so that such tubes are capable of sliding in the orifices of the head, and thus accommodate themselves to the expansion and contraction of the pipes. If desired, however, the expansion-joints may be formed by inserting the ends of the proper pipes C directly into the head B, leaving the pipes detached therefrom, as shown in Fig. 7, while the tubes D, moreover, may be left detached from the pipes, instead of from the head, to slide in the pipes, as shown in Fig. 8. The fixed joints of the outer pipes, with both heads A B, insure the required permanent connection of the heads to each other, while the expansion-joints of the remaining pipes afford a free longitudinal movement thereto, leaving the heads entirely unaffected by the expansion and contraction of such pipes, so that the outer or fixed-jointed pipes alone affect the heads under expansion and contraction, and any twisting of the heads from that cause is not liable to work any injury. A good result, however, may also be obtained by a fixed connection of intermediate pipes to the head B, using the expansion-joints on the outer pipes, as indicated in Fig. 6.

Steam is admitted to the head A at the end marked 6, and discharges therefrom at the end 7; and, in order to compel the steam to circulate through the pipes and the head B, a transverse partition, F, is arranged in the head A at a point intermediate of two of the pipes C, and preferably intermediate of the two pipes nearest the discharge end of the head, the effect of such partition being to prevent the passage of the steam directly through the head A.

That portion of the series of pipes in advance of the partition F are connected to the top portion of the head A, so as to take a downward inclination from such head to the head B, as shown in Fig. 2, while the pipe in rear of the partition is connected to the bottom portion of the head A, so as to take a horizontal or an inclined position from B to A, and it will be readily perceived that by this arrangement of the pipes a superior circulation of the steam and water of condensation is produced. The free ends of the tubes D are fitted steam-tight into the orifices of the head B, and are also provided with circumferential grooves $s'$, Fig. 5, to form a water-packing.

What I claim as new, and desire to secure by Letters Patent, is—

1. The combination, substantially as hereinbefore set forth, with the series of pipes and the end heads, of sliding expansion-joints connecting a portion of the pipes to one of the heads, and fixed joints connecting the remaining pipes to such head.

2. The combination, substantially as hereinbefore set forth, with the series of pipes and the end heads, of sliding expansion-joints connecting the intermediate pipes of the series to one of the end heads, and fixed joints connecting the outer pipes to such head.

3. The combination, substantially as hereinbefore set forth, with the series of pipes and the end heads, of supplemental pipes connecting a portion of the pipes to one of the end heads, such supplemental pipes being left detached at one end to be capable of sliding in the proper orifices.

4. The combination, substantially as hereinbefore set forth, of the series of pipes and the end heads, one having a transverse partition intermediate of two of the pipes.

5. The combination, substantially as hereinbefore set forth, of the end heads, one having a transverse partition, the pipes connected to the top portion of such head on one side of the partition, and the pipe or pipes connected to the lower portion of such head on the other side of the partition.

In testimony whereof I have hereunto set my hand and seal in the presence of two subscribing witnesses.

GEORGE B. BOOMER. [L. S.]

Witnesses:
   CHAS. WAHLERS,
   E. F. KASTENHUBER.